United States Patent
Lu

(10) Patent No.: US 8,456,872 B2
(45) Date of Patent: Jun. 4, 2013

(54) SWITCHING POWER SUPPLY

(75) Inventor: Jian-Hui Lu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 458 days.

(21) Appl. No.: 12/748,417

(22) Filed: Mar. 28, 2010

(65) Prior Publication Data

US 2010/0277953 A1    Nov. 4, 2010

(30) Foreign Application Priority Data

Apr. 8, 2009    (CN) .................. 2009 1 0301424

(51) Int. Cl.
*H02M 3/335*    (2006.01)

(52) U.S. Cl.
USPC ......................... 363/21.16; 363/49

(58) Field of Classification Search
USPC ............ 363/16–20, 21.01, 21.08, 21.12, 363/21.16–21.18, 28, 41, 98; 323/222, 224, 323/282–290, 272, 276; 361/87, 93.1, 90
See application file for complete search history.

(56) References Cited

U.S. PATENT DOCUMENTS

| | | | | |
|---|---|---|---|---|
| 4,024,437 A | * | 5/1977 | Suzuki | 361/87 |
| 4,791,544 A | * | 12/1988 | Gautherin et al. | 363/49 |
| 5,041,956 A | * | 8/1991 | Marinus | 363/21.16 |
| 5,193,211 A | * | 3/1993 | Nobusawa | 340/7.37 |
| 5,815,381 A | * | 9/1998 | Newlin | 363/17 |
| 6,456,511 B1 | * | 9/2002 | Wong | 363/21.13 |
| 6,580,258 B2 | * | 6/2003 | Wilcox et al. | 323/282 |
| 7,755,298 B2 | | 7/2010 | Liu et al. | |
| 8,045,344 B2 | * | 10/2011 | Grant | 363/28 |

FOREIGN PATENT DOCUMENTS

| | | |
|---|---|---|
| CN | 101345481 A | 1/2009 |
| JP | 2006-223032 A | 8/2006 |
| TW | 200828247 A | 7/2008 |

* cited by examiner

*Primary Examiner* — Rajnikant Patel
(74) *Attorney, Agent, or Firm* — Altis Law Group, Inc.

(57) ABSTRACT

A switching power supply includes a switching unit, a driving signal generator, and a control circuit. The driving signal generator is configured for providing a driving signal including a plurality of acting voltage parts. The plurality of acting voltage parts is used to turn on the switching unit. Each of the acting voltage parts may be one of a high level voltage and a low level voltage. The control circuit is connected between the driving signal generator and the switching unit. The control circuit turns off the switching unit when a duration of one of the plurality of acting voltage parts is longer than a preset time period.

13 Claims, 5 Drawing Sheets

SWITCHING POWER SUPPLY

BACKGROUND

1. Field of the Disclosure

Embodiments of the present disclosure relate to switching power supplies.

2. Description of Related Art

Transistors, such as metal oxide semiconductor field effect transistors (MOSFETs) are widely used in modern switching power supplies. Typically, a control circuit which generates a square wave signal is used to drive the MOSFET. The square wave signal alternates regularly between two levels: a high level and a low level. When the high level is applied to the MOSFET, the MOSFET is turned on. When the low level is applied to the MOSFET, the MOSFET is turned off. The ratio of the duration of the high level to that of the low level, namely, the pulse duration ratio, determines the output voltage of the switching power supply. The greater the pulse duration ratio, the greater the output voltage is.

Typically, a feedback circuit is utilized to feedback the output voltage to the control circuit. The control circuit adjusts the pulse duration ratio automatically according to the feedback voltage. However, when the feedback circuit is broken or damaged, the feedback signal may be incorrect. As a result, the pulse duration ratio may be too great to give the wrong output voltage, and may even damage the MOSFET.

Therefore, a switching power supply having an improved driving circuit for a transistor is needed to address the aforementioned deficiency and inadequacies.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

References will now be made to the drawings to describe certain inventive embodiments of the present disclosure.

Figure 1:
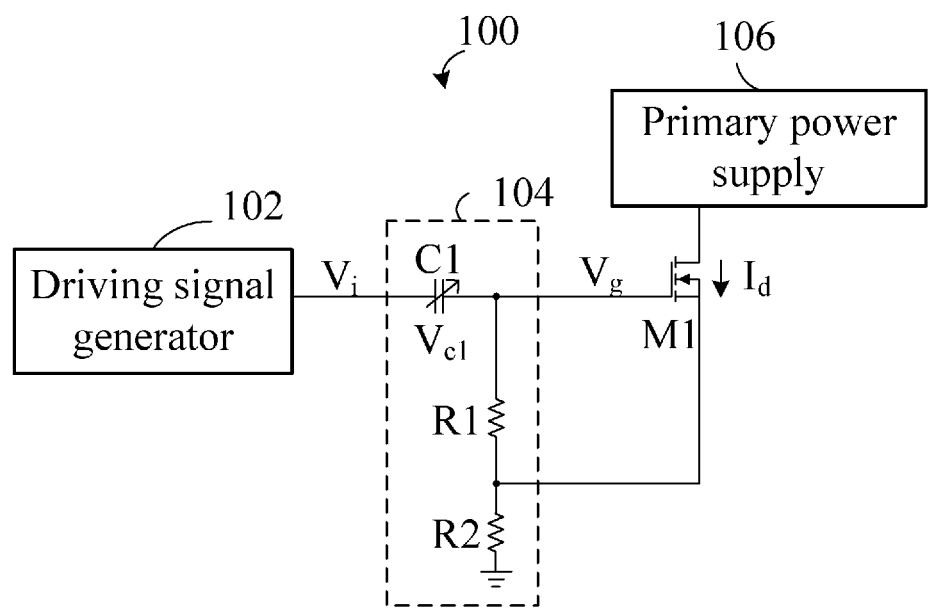
FIG. 1 is a block diagram of switching power supply in accordance with a first embodiment.

Referring to FIG. 1, a switching power supply 100 in accordance with an exemplary embodiment includes a switching unit M1, a driving signal generator 102, a control circuit 104, and a primary power supply 106. The switching unit M1 is an N-Channel enhancement type metal oxide semiconductor field effect transistor (MOSFET). In other embodiments, the switching unit M1 may be a bipolar junction transistor. The primary power supply 106 is connected to the drain of the MOSFET to power the MOSFET, and control the value of a current Id that flows through the source and drain of the MOSFET when the MOSFET turns on.

Figure 2A:
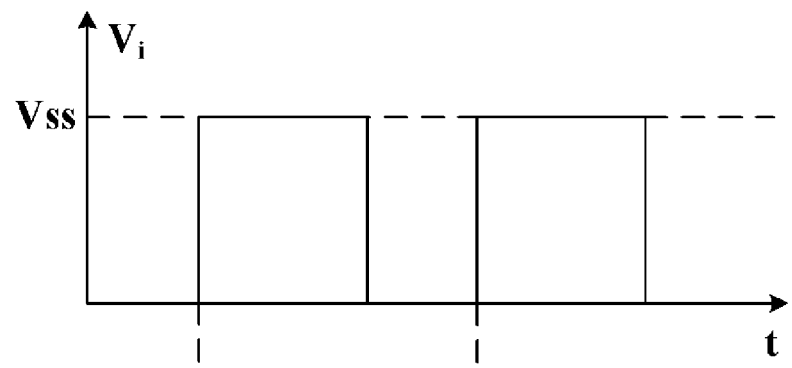
FIGS. 2a-2c are graphs of three waveforms generated by the switching power supply of FIG. 1.
Figure 2B:
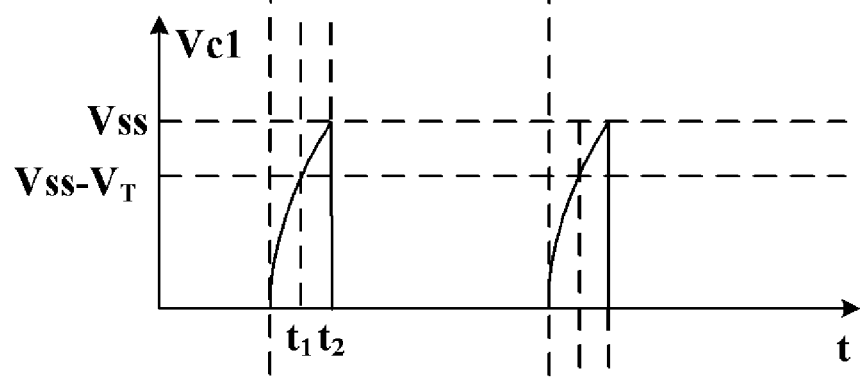
Figure 2C:
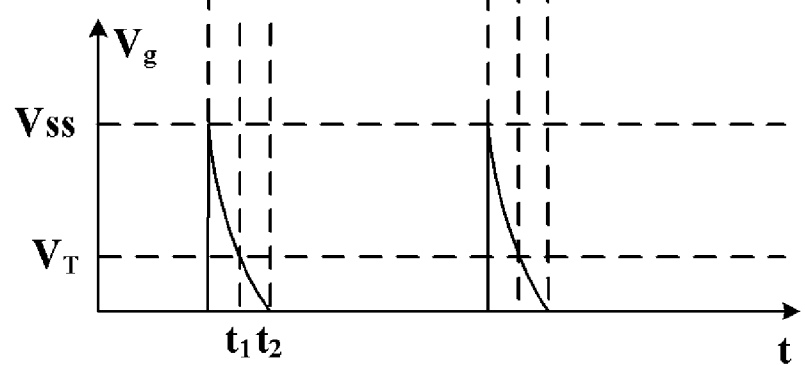

The driving signal generator 102 is operable to supply a first driving signal Vi for the MOSFET. Referring further to FIG. 2, in the embodiment, the first driving signal Vi is a square wave signal which alternates regularly between a high level voltage Vss and a low level voltage. The low level voltage may be lower than 0.7V. As the switching unit M1 is an N-Channel enhancement type MOSFET, the acting voltage parts, those can turn on the MOSFET, of the first driving signal are the high level voltage Vss. In other embodiments, the acting voltage parts may be the low level voltage when the switching unit M1 is a P-Channel MOSFET.

The control circuit 104 is electrically connected between the driving signal generator 102 and the MOSFET. The control circuit 104 is configured to receive the driving signal Vi and generate a second driving signal Vg according to the first driving signal Vi. The second driving signal Vg is also a kind of pulse signals. Each of the pulses of the second driving signal Vg includes a high voltage part and a low voltage part. The high voltage part starts with a high voltage that equals to the high level voltage Vss and falls down from the high voltage to a low voltage Vt after a preset time period. The low voltage part starts with the low voltage Vt, and may finally fall to zero. The MOSFET is turned on when receiving the high voltage part of the second driving signal Vg, and is turned off when receiving the low voltage part.

In the embodiment, the control circuit 104 includes a capacitor C1, a first resistor R1, and a second resistor R2. The capacitor C1 is connected between the driving signal generator 102 and the gate of the MOSFET. A terminal of the first resistor R1 is connected to the gate of the MOSFET. The other terminal of the first resistor R1 is connected to a terminal of the second resistor R2 and the source of the MOSFET. The other terminal of the second resistor R2 is grounded. The capacitor C1 is adjustable.

Referring to FIG. 2, when the first driving signal Vi becomes the high level voltage Vss from the low level voltage at time point t0, the capacitor C1 is charged, and the high level voltage Vss is conducted to the gate of the MOSFET. Thus, a voltage at the gate of the MOSFET, that is the second driving signal Vg, becomes a high voltage at the time point t0. The MOSFET is turned on. After that, a voltage Vc1 across the capacitor C1 increases, while the second driving signal Vg decreases. When the voltage Vc1 across the capacitor C1 is higher than Vss-Vt (Vt is the threshold voltage of the MOSFET), and the second driving signal Vg is lower than Vt at the time point t1, the MOSFET is turned off.

To summarize, when a duration of a high level voltage of the first driving signal Vi is longer than the time period t1-t0 and the time period t1-t0 ends, the MOSFET will be turned off by the control circuit 104. When the duration of each high level voltage of the first driving signal Vi is shorter than or equal to the time period t1-t0, and the high level voltage of the first driving signal Vi ends, the MOSFET will be turned off, thus the control circuit 104 will not diminish the effectiveness of the first driving signal Vi. Therefore, the MOSFET will not be damaged due to long-duration high level voltages of the first driving signal Vi. The time period t1-t0 is adjustable to meet different design demands by adjusting the capacitor C1.

Figure 3:
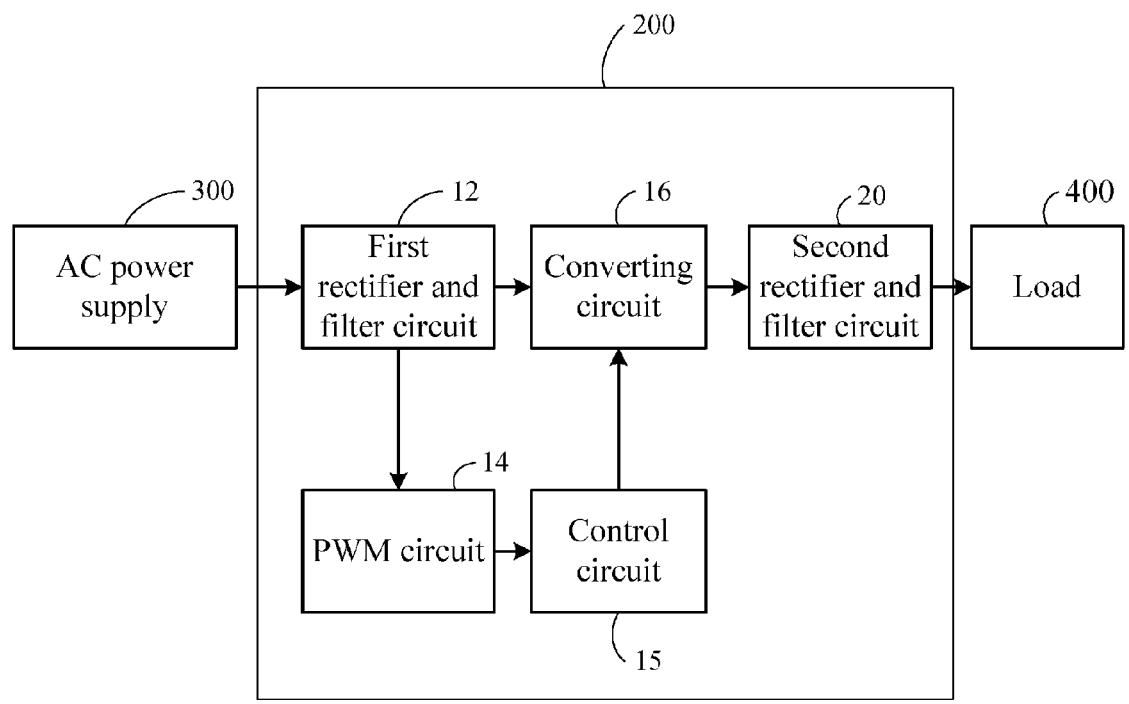
FIG. 3 is a block diagram of switching power supply in accordance with a second embodiment.
Figure 4:
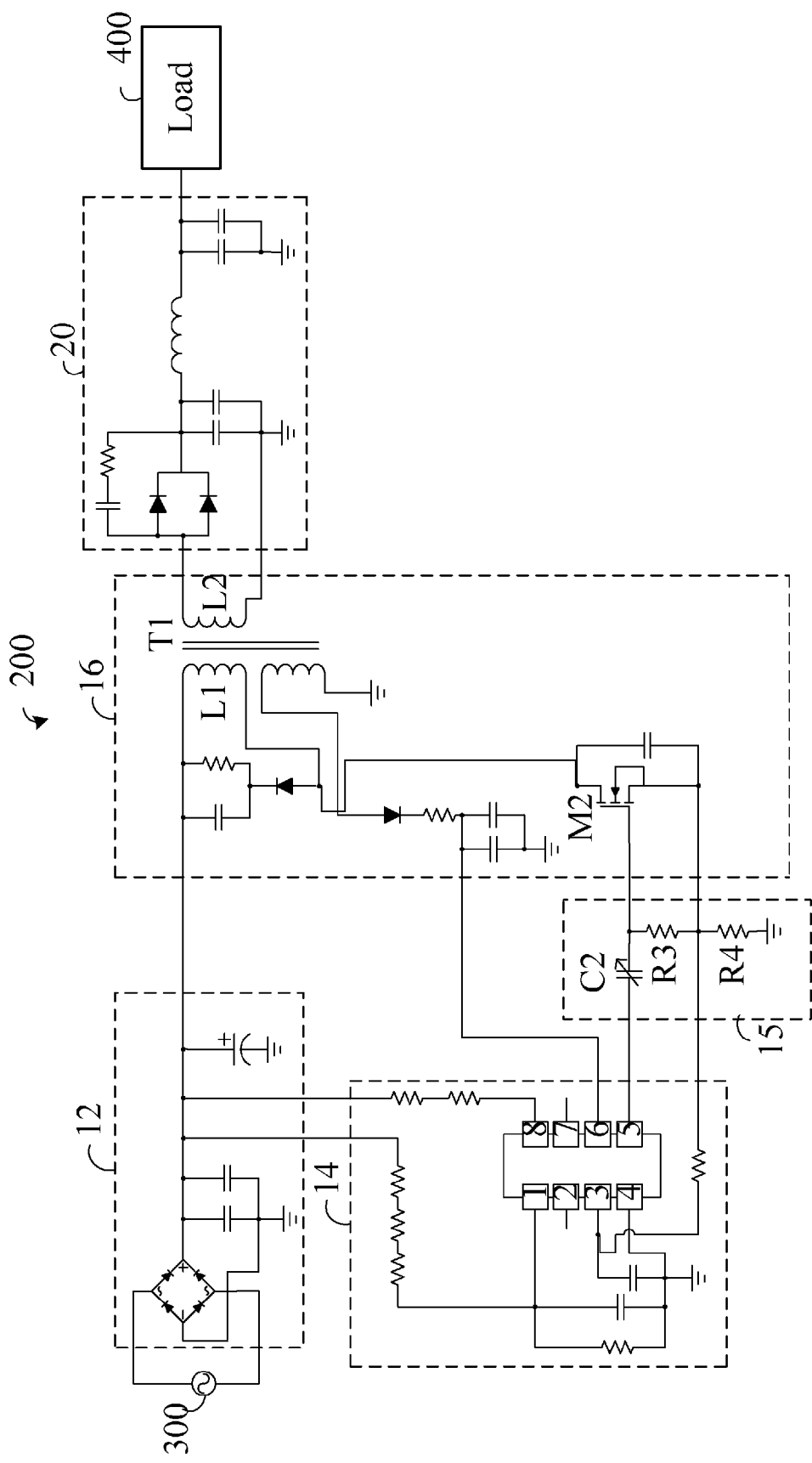
FIG. 4 is a circuit diagram of the switching power supply of FIG. 3.

Referring to FIGS. 3-4, in a second embodiment, a switching power supply 200 is used for receiving an alternating current (AC) voltage from an AC power supply 300, and converting the received AC voltage into a second direct current (DC) voltage to power a load 400. The switching power supply 200 includes a first rectifier and filter circuit 12, a pulse-width modulation (PWM) circuit 14, a control circuit 15, a converting circuit 16, and a second rectifier and filter circuit 20.

The first rectifier and filter circuit 12 is configured to convert the received AC voltage to a first DC voltage, and filtering the first DC voltage. The first rectifier and filter circuit 12 may include a full-bridge rectifier and at least one filtering capacitor.

The PWM circuit 14 is configured to receive the first DC voltage and supply a pulse signal to the control circuit 15. The PWM circuit 14 may include a PWM chip. The first DC voltage may be used to start up the PWM chip. The pulse signal is a square wave signal which alternates regularly between a high level voltage and a low level voltage. The low level voltage is lower than the threshold voltage of the transistor M2.

The converting circuit 16 is configured to convert the first DC voltage to the second DC voltage to power the load 400 according to the pulse signal. The converting circuit 16 includes a transistor M2. In the embodiment, the transistor M2 is an N-Channel enhancement type metal oxide semiconductor field effect transistor (MOSFET). In other embodiments, the transistor M2 may be a bipolar junction transistor. In the embodiment, the converting circuit 16 further includes a transformer T1. The transformer T1 includes a primary winding L1, and a secondary winding L2 connected to the second rectifier and filter circuit 20. A terminal of the primary winding L1 is connected to the first rectifier and filter circuit 12 to receive the first DC voltage. The other terminal of the primary winding L1 is connected to the drain of the transistor M2. When the transistor M2 is turned on, a varying current flows through the primary winding L1, and the secondary winding L2 generates an inductive voltage, the second DC voltage in the embodiment.

The second rectifier and filter circuit 20 is configured to rectify and filter the second DC voltage to make the second DC voltage smoother.

The control circuit 15 is connected between the PWM circuit 14 and the gate of the transistor M2. The control circuit 15 is configured to turn off the transistor M2 when a duration of a pulse of the pulse signal is longer than a preset time period. When the duration of the pulse is shorter than or equal to the preset time period, the transistor M2 is turned off when the pulse ends. In the embodiment, the structure of the control circuit 15 is similar to that of the control circuit 104 in the first embodiment. The control circuit 15 includes a capacitor C2, a third resistor R3, and a fourth resistor R4. The capacitor C2 is connected between the PWM circuit 14 and the gate of the transistor M2. A terminal of the third resistor R3 is connected to the gate of the transistor M2. The other terminal of the third resistor R3 is connected to a terminal of the fourth resistor R4 and the source of the transistor M2. The other terminal of the fourth resistor R4 is grounded. The capacitor C2 is adjustable.

Figure 5A:
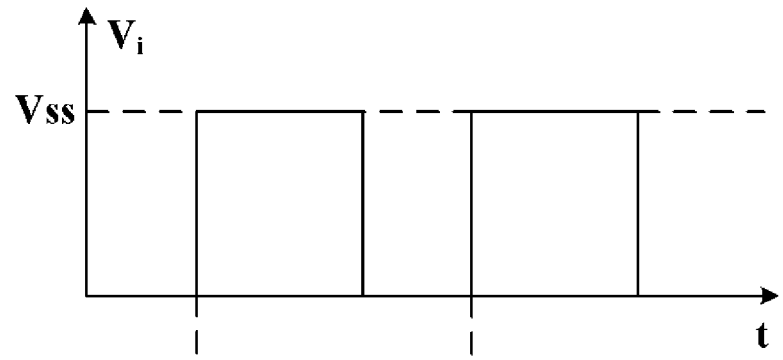
FIGS. 5a-5c are graphs of three waveforms generated by the switching power supply of FIG. 4.
Figure 5B:
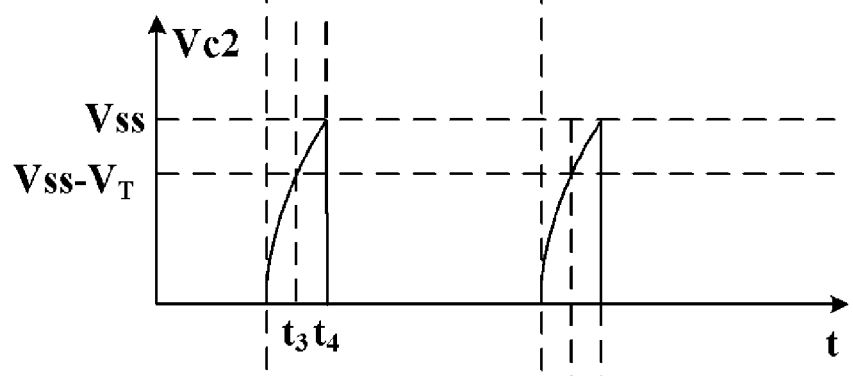
Figure 5C:
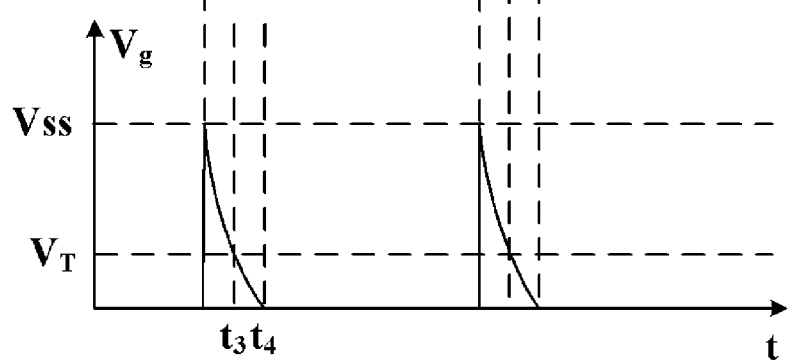

Referring to FIG. 5, a voltage across the capacitor C2 is labeled as Vc2. A voltage at the gate of the transistor M2 is labeled as Vg2. When the pulse signal becomes a high level voltage Vss2 from the low level voltage at time point t2, the capacitor C2 is charged, and the high level voltage Vss2 is conducted to the gate of the transistor M2. The transistor M2 is turned on. After that, the voltage Vc2 across the capacitor C2 increases, while the voltage Vg2 decreases. When the voltage Vc2 is higher than Vss2-Vt2 (Vt2 is the threshold voltage of the transistor M2), and the voltage Vg2 is lower than Vt at the time point t3, the transistor M2 is turned off.

To summarize, when a duration of a pulse of the pulse signal is longer than the time period t2-t3 and the time period t2-t3 ends, the transistor M2 will be turned off by the control circuit 15. When the duration of the pulse is shorter than or equal to the time period t2-t3 and the pulse ends, the transistor M2 will be turned off, and the control circuit 15 will not diminish the effectiveness of the pulse signal. Therefore, the transistor M2 will not be damaged due to long-duration pulses of the pulse signal. The time period t3-t2 is adjustable to meet different design demands by adjusting the capacitor C2.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A switching power supply, comprising:
   a switching unit;
   a driving signal generator for providing a driving signal, the driving signal comprising a plurality of acting voltage parts, the plurality of acting voltage parts being used to turn on the switching unit, each of the acting voltage parts being one of a high level voltage and a low level voltage; and
   a control circuit coupled between the driving signal generator and the switching unit;
   wherein the control circuit turns off the switching unit when a duration of one of the plurality of acting voltage parts is longer than a preset time period, the switching unit comprises a metal oxide semiconductor field effect transistor (MOSFET), the switching power supply further comprises a primary power supply connected to the drain of the MOSFET, the control circuit further comprises a first resistor and a second resistor, the capacitor is connected between the driving signal generator and the gate of the MOSFET, a terminal of the first resistor is connected to the gate of the MOSFET, the other terminal of the first resistor is connected to a terminal of the second resistor and the source of the MOSFET, the other terminal of the second resistor is grounded.

2. The switching power supply as claimed in claim 1, wherein the control circuit comprises a capacitor, the control circuit turns off the switching unit whenever the capacitor has being charged by the first driving signal for the preset time period.

3. The switching power supply as claimed in claim 1, wherein the first driving signal is a square wave signal.

4. The switching power supply as claimed in claim 2, wherein when the duration of one of the plurality of acting voltage parts is shorter than or equal to the preset time period, the switching unit is turned off when the one of the plurality of acting voltage part ends.

5. The switching power supply as claimed in claim 1, wherein the preset time period is equal to a time period during which the capacitor is charged and a gate voltage of the MOSFET reaches to the gate threshold voltage of the MOSFET.

6. The switching power supply as claimed in claim 2, wherein the capacitor is adjustable.

7. The switching power supply as claimed in claim 1, wherein the capacitor is adjustable, such that the preset time period is adjustable.

8. A switching power supply, comprising:
   a first rectifier and filter circuit for converting a received alternating current (AC) voltage to a first direct current (DC) voltage, and filtering the first DC voltage;

a pulse-width modulation circuit for receiving the first DC voltage and supplying a pulse signal;
a converting circuit for converting the first DC voltage to a second DC voltage to power a load according to the pulse signal, the converting circuit comprising a transistor; and
a control circuit connected between the pulse-width modulation circuit and the gate of the transistor;
wherein the control circuit turns off the transistor when a duration of a pulse of the pulse signal is longer than a preset time period, the control circuit comprises a capacitor, the control circuit turns off the transistor whenever the capacitor has being charged by the pulse for the preset time period, the transistor is a metal oxide semiconductor field effect transistor (MOSFET), the preset time period is equal to a time period during which the capacitor is charged and a gate voltage of the MOSFET reaches to the gate threshold voltage of the MOSFET, the control circuit further comprises a first resistor and a second resistor, the capacitor is connected between the driving signal generator and the gate of the MOSFET, a terminal of the first resistor is connected to the gate of the MOSFET, the other terminal of the first resistor is connected to a terminal of the second resistor and the source of the MOSFET, the other terminal of the second resistor is grounded.

9. The switching power supply as claimed in claim 8, wherein the pulse signal is a square wave signal.

10. The switching power supply as claimed in claim 8, wherein when the duration of the pulse is shorter than or equal to the preset time period, the transistor is turned off when the pulse ends.

11. The switching power supply as claimed in claim 8, wherein the capacitor is adjustable.

12. The switching power supply as claimed in claim 8, further comprising a second rectifier and filter circuit for rectifying and filtering the second DC voltage.

13. The switching power supply as claimed in claim 8, wherein the capacitor is adjustable, such that the preset time period is adjustable.

* * * * *